United States Patent Office 2,721,217
Patented Oct. 18, 1955

2,721,217

METHOD OF PREPARING DIAMINOGUANIDINE HYDROCHLORIDE

Grace A. Peters, Stamford, and Donald W. Kaiser, Old Greenwich, Conn., assignors to American Cyanamid Company, New York, N. Y., a corporation of Maine No Drawing. Application September 11, 1953, Serial No. 379,742

3 Claims. (Cl. 260—564)

The present invention relates to the preparation of diaminoguanidine hydrochloride.

Known methods of preparing diaminoguanidine hydrochloride involve reactions in which considerable quantities of by-products are formed and in which difficulty is encountered in their separation. For example, in the production of diaminoguanidine hydrochloride by reacting cyanogen chloride with hydrazine in an aqueous medium, appreciable amounts of guanazine, carbamylcarbazide and triaminoguanidine are formed. As a result, the yield of diaminoguanidine hydrochloride is low and an impure product contaminated by one or more of the by-products is obtained.

Accordingly, it is the principal object of the present invention to devise an economical method by which diaminoguanidine hydrochloride may be obtained in good yields and high purity.

Surprisingly, this object has been accomplished in a simple and effective manner by causing 2 molar equivalents of hydrazine to react with 1 molar equivalent of cyanogen chloride in a substantially saturated aqueous sodium chloride solution maintained at a temperature not greater than about 20° C.

In the practice of the present invention, it is essential that the reactants be brought together in the proportion of 2 molar equivalents of hydrazine to one molar equivalent of cyanogen chloride. The reaction may be illustrated as follows:

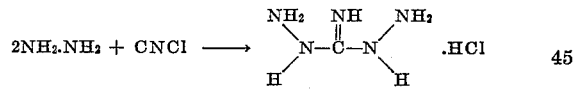

The hydrazine is dissolved in a saturated aqueous sodium chloride solution (approximately 36 g. of NaCl per 100 g. of water), maintained at a temperature within the range of from about 0° C. to about 20° C., and preferably between 5° and 15° C. The cyanogen chloride is then vaporized slowly into the solution with good agitation. The diaminoguanidine hydrochloride precipitates after addition of the cyanogen chloride is completed and is easily filtered from the reaction mixture.

The invention is further illustrated, but not limited, by the following example:

30 g. (0.6 mole) of hydrazine hydrate ($NH_2.NH_2.H_2O$) was dissolved in an aqueous sodium chloride solution (36 g. of NaCl in 100 cc. of water), maintained at about 10° C. with good stirring. 18 g. (0.3 mole) of cyanogen chloride was added to the solution as a vapor during a period of two hours, the temperature of the mixture being maintained between 5° and 10° C. The cold reaction mixture was stirred for one hour and then filtered to remove the precipitated diaminoguanidine hydrochloride. 26.5 g. (70.7% yield) of the white crystalline product was obtained having a melting point of 170°–176° C.

The present invention provides a simple, economical method of preparing diaminoguanidine hydrochloride in good yields. Side reactions are suppressed and the product is easily recovered from the reaction mixture in substantially pure form.

While the invention has been described with particular reference to specific embodiments, it is to be understood that it is not to be limited thereto but is to be construed broadly and restricted solely by the scope of the appended claims.

We claim:

1. A method of preparing diaminoguanidine hydrochloride which comprises bringing together two molar equivalents of hydrazine and one molar equivalent of cyanogen chloride in a substantially saturated aqueous sodium chloride solution maintained at a temperature not greater than 20° C., and subsequently recovering diaminoguanidine hydrochloride from the resulting mixture.

2. The method of claim 1 in which the temperature is within the range of 5° to 15° C.

3. The method of claim 1 in which the aqueous sodium chloride solution consists of approximately 36 parts by weight of sodium chloride and 100 parts by weight of water.

References Cited in the file of this patent

Migrdichian, The Chem. of Cyanogen Compounds, A. C. S. Monograph Series No. 105, page 104 (1947).